United States Patent
Chen et al.

(10) Patent No.: US 10,180,899 B2
(45) Date of Patent: Jan. 15, 2019

(54) DEVICE FOR AUTOMATICALLY GENERATING TEST CASES FOR EMBEDDED SOFTWARE USING SYMBOLIC AND CONCRETE EXECUTION

(71) Applicant: UNIVERSITY OF ELECTRONIC SCIENCE AND TECHNOLOGY OF CHINA, Chengdu,Sichuan (CN)

(72) Inventors: Ting Chen, Sichuan (CN); Xiaosong Zhang, Sichuan (CN); Dong Wang, Sichuan (CN); Ruidong Chen, Sichuan (CN); Weina Niu, Henan (CN); Xiaofen Wang, Sichuan (CN)

(73) Assignee: UNIVERSITY OF ELECTRONIC SCIENCE AND TECHNOLOGY OF CHINA, Chengdu, Sichuan (CN)

( * ) Notice: Subject to any disclaimer, the term of this patent is extended or adjusted under 35 U.S.C. 154(b) by 148 days.

(21) Appl. No.: 15/112,689

(22) PCT Filed: Jul. 30, 2014

(86) PCT No.: PCT/CN2014/083338
§ 371 (c)(1),
(2) Date: Jul. 20, 2016

(87) PCT Pub. No.: WO2016/004657
PCT Pub. Date: Jan. 14, 2016

(65) Prior Publication Data
US 2017/0010956 A1    Jan. 12, 2017

(30) Foreign Application Priority Data
Jul. 11, 2014 (CN) .......................... 2014 1 0329276

(51) Int. Cl.
*G06F 11/00* (2006.01)
*G06F 11/36* (2006.01)

(52) U.S. Cl.
CPC .......... *G06F 11/3684* (2013.01); *G06F 11/36* (2013.01); *G06F 11/3664* (2013.01); *G06F 11/3688* (2013.01)

(58) Field of Classification Search
CPC ............... G06F 11/362; G06F 11/3664; G06F 11/3684; G06F 11/3688
See application file for complete search history.

(56) References Cited

U.S. PATENT DOCUMENTS

| 7,007,007 | B2 * | 2/2006 | Slutz .................... G06F 11/3672 707/808 |
| 8,387,018 | B2 * | 2/2013 | Artzi .................... G06F 11/3688 714/38.1 |

(Continued)

OTHER PUBLICATIONS

English Translation of the Written Opinion of the International Search Authority for PCT/CN2014/083338. (dated Year: 2015).*

*Primary Examiner* — Elmira Mehrmanesh

(57) ABSTRACT

A device and a method are provided to automatically generate test case for embedded software. This invention is in software test field, including symbolic execution kernel module, path selection module, solver, debugger, concrete execution kernel module and debugger agent module. The tested software and test cases are uploaded from the host system to the embedded system through debugger and debugger agent. The concrete execution kernel module starts the tested software. The symbolic execution kernel module captures the run-time information of the tested software through the debugger. When the tested software operates on the symbol source, the symbolic execution kernel module marks the symbol source, tracks the symbol propagation, generates path condition and sends the path condition to path selection module. This invention can automatically generate test cases for embedded software, which doesn't need the (Continued)

source code of the tested software and can be conveniently used for commercial software.

5 Claims, 2 Drawing Sheets

(56) References Cited

U.S. PATENT DOCUMENTS

| | | | | |
|---|---|---|---|---|
| 8,468,499 | B2* | 6/2013 | Dhurjati | G06F 11/3676 717/124 |
| 8,645,924 | B2* | 2/2014 | Li | G06F 8/443 717/124 |
| 9,037,916 | B2* | 5/2015 | Kalman | G06F 11/3612 714/37 |
| 9,183,396 | B2* | 11/2015 | Brumley | G06F 21/577 |
| 2012/0084759 | A1* | 4/2012 | Candea | G06F 11/3612 717/126 |
| 2014/0304685 | A1* | 10/2014 | Xie | G06F 9/455 717/124 |
| 2015/0302126 | A1* | 10/2015 | Hamid | G01R 31/3177 716/136 |

* cited by examiner

DEVICE FOR AUTOMATICALLY GENERATING TEST CASES FOR EMBEDDED SOFTWARE USING SYMBOLIC AND CONCRETE EXECUTION

CROSS REFERENCE OF RELATED APPLICATION

This is a U.S. National Stage under 35 U.S.C. 371 of the International Application PCT/CN2014/083338, filed Jul. 30, 2014, which claims priority under 35 U.S.C. 119(a-d) to CN 201410329276.4, filed Jul. 11, 2014.

BACKGROUND OF THE PRESENT INVENTION

Field of Invention

The present invention is related to software test field, and more particular to a method of automatically generating test cases for embedded software and a device thereof. The tested program hereof is embedded software. Using this device and method can automatically generate test cases.

Description of Related Arts

With the wide application of the devices installed with embedded software, the quality of the embedded software becomes the key factor which has great influence on national economy, personal security and property security. Software testing is commonly used for improving the quality of software. But traditional methods can not thoroughly test embedded software because test cases can not cover all possible execution conditions.

The concept of symbolic execution technique was brought out around 1970. This technique has become the research hot spot recently. Dynamic symbolic execution technique is a modification of symbolic execution technique, which combines symbolic execution and concrete execution. Generally speaking, dynamic symbolic execution runs the tested software, collects path conditions while execution and generating new test cases after calculating on the path conditions. Theoretically, dynamic symbolic execution technique can test the software thoroughly because the newly generated test cases can cover all the unexecuted paths.

Due to the capability of the software and hardware of the embedded system, particularly the limitation of the computing capability of the processor and the memory space, current dynamic symbolic execution software which can run well in the general-purpose computing platform cannot be applied to the embedded software directly. Considering the complexity of the solver and the instrumentation software, directly importing the dynamic symbolic execution software from the general-purpose platform in the embedded system will cause extremely heavy developing workload.

Described in the literature SCORE: a scalable concolic testing tool for reliable embedded software, Kim and other researchers import the CREST and KLEE in the embedded system. Similar method is described in the following five papers: Concolic testing on embedded software—case studies on mobile platform programs, Industrial application of concolic testing on embedded software: Case studies, A case study on libexif by using CREST-BV and KLEE, Scalable distributed concolic testing: a case study on a flash storage platform, Concolic testing of the multi-sector read operation for flash memory file system. The aforementioned five papers describe similar methods which mainly focus on the following points: (1) Modify current dynamic symbolic execution software CREST or KLEE which runs on the general-purpose platform; (2) The source code of the tested software is instrumented using the modified dynamic symbolic execution software; (3) Run the tested software after instrumentation on the embedded system; (4) Use the modified solver to create new test cases on the embedded system. The aforementioned method has the following disadvantages: (1) The C/C++ source code of the tested software is required; (2) A lot of modifications on dynamic symbolic execution software and solver are required; (3) The symbolic execution part of the above method runs on the embedded system, which will cause huge resource consumption.

Described in the literatures Structural Testing of Executables and OSMOSE: Automatic structural testing of executables, Bardin and others bring up the idea of translating the executable code of the tested software into an intermediate language, and then symbolically executing the intermediate language in the simulator. Using this and similar method has the following disadvantages: (1) For different embedded systems, corresponding simulators need to be developed; (2) Execution conditions of the tested software in the simulator may not be the same with real execution conditions.

The literature Unleashing mayhem on binary code brings up the idea of dividing the dynamic symbolic execution into concrete execution process and symbolic execution process. Running the concrete execution process on the target system and running the symbolic execution process on any platform. This method has the following disadvantages: (1) The concrete execution part of this method includes taint tracking, dynamic binary instrumentation, virtual machine and other functional modules which consume huge resources, so it is not suitable to run on the embedded system; (2) In order to perform dynamic taint analysis on the embedded system, it is necessary for this method to import taint tracking software, dynamic binary instrumentation software, and virtual machine; (3) This method adopts hybrid symbolic execution; (4) This method designs and realizes a cross-platform lightweight RPC protocol to connect concrete execution process and symbolic execution process, but this method still is not applied to the test of embedded software.

SUMMARY OF THE PRESENT INVENTION

Aiming at the aforementioned existing technical problems, an object of the present invention is to provide a method and device for automatically generating test cases for embedded software. This method is able to adapt to the limitation of the capability of the software and hardware on the embedded system, and take full advantage of current dynamic symbolic execution software for the general-purpose platform, so that the workload for importing the code in the embedded system is rather low. Moreover, with this method the actual running condition of the software is able to be obtained for avoiding false positives, and no source code of the tested software is needed, so it is able to be conveniently used to test commercial embedded software.

In order to achieve the aforementioned object, this invention adopts the below technical solution:

A device for automatically generating test cases for embedded software, comprises:

a host system for running a symbolic execution part;

an embedded system for running a concrete execution part;

a symbolic execution kernel module for marking a symbol source, tracking a symbol propagation, generating a path condition, maintaining an execute tree of a tested software while running;

a path selection module for running a path selection algorithm;

a solver for judging whether a path condition is satisfied, wherein if not, indicate a corresponding path is not feasible, if yes, generate a new set of assignments, the new set of assignments is explained as a new test case for covering the path corresponding to the path condition;

a test case selector for selecting a test case from a test case pool to be an input of the tested software;

a debugger, as an only module on the host system which communicates with the embedded system, which is in charge of receiving the tested software and commands from the symbolic execution kernel module, receiving the test cases from the test case selector, sending the commands, the tested software and the test cases to the embedded system, and receiving run-time information of the tested software from the embedded system before sending the information back to the symbolic execution kernel module;

an intermediate language translation module for translating machine instructions into an intermediate language according to a type of the intermediate language which the symbolic execution kernel module is able to process and a type of the machine instructions;

a concrete execution kernel module, for performing main functions of the concrete execution part, including starting and stopping the tested software, setting breakpoints, single step debugging, continuing to execute the tested software and capturing a value of a designated register and memory location; and a debug agent module, as an only module on the embedded system which communicates with the host system, which is responsible for re-directing the commands to the concrete execution kernel module and sending run-time information of the tested software to the host system, wherein:

the tested software and test cases are uploaded to the embedded system through the debugger and the debug agent from the host system; the concrete execution kernel module starts the tested software; the symbolic execution kernel module captures the run-time information of the tested software through the debugger; when the tested software operates on a symbol source, the symbolic execution kernel module finishes marking the symbol source and tracking the symbol propagation, then generating path condition; the symbolic execution kernel module sends the generated path condition to the path selection module; the path selection module constructs one or more path conditions according to a path selection algorithm and sends the path condition to the solver; the solver works on the inputted path condition, if there is a solution, the solver will create a corresponding test case and save the corresponding test case in the test case pool of the host system.

In the present invention, the symbol source is data which are able to be directly handled by clients, such as disk files, network data package and keyboard input.

In the present invention, the path selection algorithm comprises in-depth priority, breadth priority, generational search, and random search.

In a method for automatically generating test cases based on the above mentioned device for automatically generating test cases, the dynamic symbolic execution is divided into concrete execution part and symbolic execution part, wherein the concrete execution part runs on the embedded system, and the symbolic execution part runs on the host system; wherein the method comprises steps of:

S1: starting a host system and an embedded system, uploading a tested software from the host system onto the embedded system through a debugger and a debug agent, uploading an initial test case from the host system onto the embedded system through the debugger and the debug agent, randomly generating an initial test case;

S2: a concrete execution kernel module starting the tested software;

S3: a symbolic execution kernel module capturing a run-time information of the tested software through the debugger, wherein while the tested software operates on the symbol source, a symbolic execution kernel module finishes marking the symbol source;

S4: the symbolic execution kernel module tracking symbol propagation and generating path conditions, and in the process, capturing the run-time information of the tested software through the debugger;

S5: when the tested software stops running and exits normally or when error occurs, the symbol execution kernel module sending the path conditions to the path selection module, according to the path selection algorithm, the path selection module constructing one or more path conditions, and sending the path conditions to the solver;

S6: the solver working on the input path condition, wherein if there is solution, then a corresponding test case is created and saved in a test case pool, if there is no solution, then go to S7; and S7: the symbol execution kernel module judging whether the system should be stopped, wherein if yes, then stop the whole system, if not, the test case selector will choose new test case to be the input of the tested software and return to S2.

Furthermore, in S7, the stop condition comprises all the paths of the tested software are covered, the pre-set code coverage rate is reached, the bug in the tested software is found and the pre-set test budget is reached.

Compared to current technology, this invention has the below advantages:

1. Concrete execution part runs on the embedded system and can capture accurate run-time information of the tested software. This method is more accurate than running in the simulator. Only the concrete execution runs on the embedded system, which will not bring extra cost for the embedded system.

2. Symbolic execution part runs on the host system. This limits the symbolic execution with huge consumption to the resourceful host system. This method will avoid the low capability problem of the software and hardware on the embedded system. This method can also take full advantage of the dynamic symbolic execution software on current general-purpose computer system which will greatly reduce the software development workload.

3. The invention uses current intermediate code translate module. It will translate the machinery instruction into intermediate language according to the needs. So the invention doesn't need the source code of tested software.

4. The invention can fix the problem of low capability of the software and hardware on the embedded system. The test case for the embedded software can be created automatically.

DETAILED DESCRIPTION OF THE PREFERRED EMBODIMENT

Figure 1:
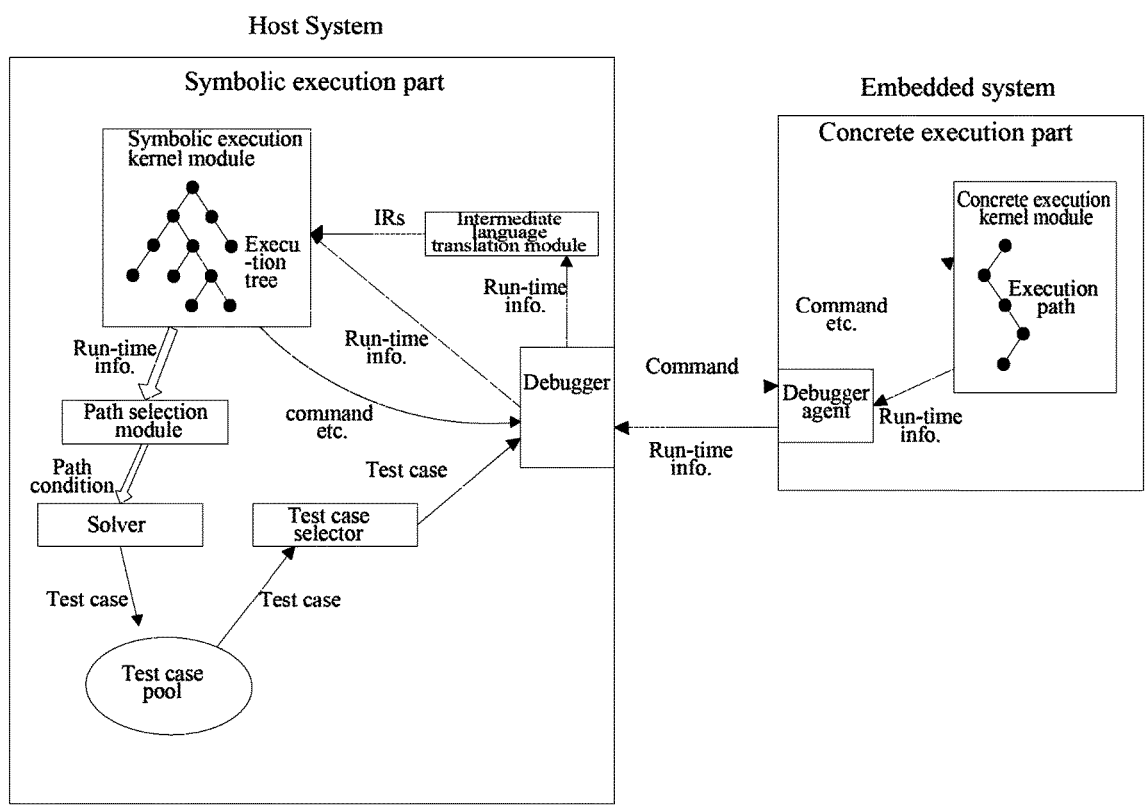
FIG. 1 is an overall structural diagram of the present invention.

The present invention is further explained with the accompanying drawings and embodiments as follows.

Embodiment

Aim at the embedded operation system VxWorks version 6.6 developed by Windriver Company;

Import the early developed dynamic symbolic execution software SMAFE for the general-purpose computing platform to the VxWorks. SMAFE is for x86/Windows platform. It adopts the dynamic binary instrumentation software PIN and solver STP. The source code is about 10000 lines in C/C++. Using the method in the invention, only needs to write 1500 lines of C/C++ code to import SMAFE to x86/VxWorks platform. For detailed information of SMAFE please refer to our early academic writing Design and implementation of a dynamic symbolic execution tool for windows executables. Because SMAFE can directly symbolic execute x86 machinery instructions, there is no need to translate the code into any intermediate language when importing SMAFE to the x86/VxWorks platform.

Part of the code of SMAFE directly calls PIN which needs to be imported. A large amount of code which doesn't need call PIN can be use directly without any modification, such as the path selection module, solver, test case selector, tracking symbol propagation. Use the WTX protocol owned by Windriver Company to capture the run-time information of the tested software, which realizes the communication and synchronize function of the symbolic execution part and concrete execution part. Listed in Table 1 are the API functions provided by WTX protocol and their usage in this embodiment.

protocol. WTX protocol doesn't provide direct system initialize ability. In order to initialize the system, multiply steps are needed as follows:

(1) Establish a WTX session on the host side;
(2) Connect the host to the embedded system;
(3) Register two functions to handle the events which corresponding to TEXT_ACCESS and CTX_EXIT respectively; wherein TEXT_ACCESS indicates that reach the breakpoint, and CTX_EXIT indicates that the tested software is finished and exit;
(4) Upload the tested software and initial test case on the embedded system, record the position of the tested software in the memory of the embedded system in order to identify the instructions of the tested software and the instructions of the embedded system;
(5) Search the entry of the tested software and set a breakpoint at the entry; when the tested software begins to run, a TEXT_ACCESS will be triggered;
(6) Register a callback function at the I/O function, wherein when execute the I/O function the corresponding callback function will be executed. This callback function is used for marking the symbol source; and
(7) Run the tested software and wait to the event to be triggered.

2. The process of event handling: For TEXT_ACCESS and CTX_EXIT, special handling is done. When these two events are triggered, the following procedures are went through:

(a) Delete the breakpoint set on this instruction;
(b) Capture current actual values of all the registers and save them in a data structure;
(c) Capture current instruction, adopt open source disassembly software to disassemble the captured instructions, save the detailed information in a data structure and prepare for future use while symbolic execution;

TABLE 1

API function of WTX protocol used in this embodiment

| No. | API | Description |
|---|---|---|
| 1 | wtxObjModuleLoad | Upload the tested software and test case on the embedded system |
| 2 | wtxObjModuleInfoGet | Get the position of the tested software on the embedded system. The position is used for identify the instructions of the tested software and the system's own instructions. |
| 3 | wtxRegsGet | Get values from a designated register |
| 4 | wtxMemRead | Read the values from the designated memory locations |
| 5 | wtxMemDisassemble | Disassemble the designated instruction. This API can not provide sufficient information. In this embodiment, an open source disassembly software is adopted to get more information |
| 6 | wtxContexResume | Resume executing the tested software. This API is called in two occasions. One is when starting the tested software because when uploading the tested software on the embedded system, the tested software is in a suspended state. The other is when concrete executing the system's own instruction. |
| 7 | wtxEventpointAdd | Set the breakpoint by setting event type to TEXT_ACCESS |
| 8 | wtxContextCont | Resume from the breakpoint |
| 9 | wtxRegisterForEvent | Register event handling functions. In this embodiment two events TEXT_ACCESS and CTX_EXIT are handled |

1. Initialize the system: Initialize the original SMAFE is very simple. The corresponding function provided by PIN is directly called. But this embodiment is based on WTX (d) Judge whether current instruction is the first instruction of a certain function, mark this function as f1; if yes, in this embodiment, check whether there is registered callback function should be executed before we execute f1, mark this callback function as f2; If yes, in this embodiment, execute f2 first and after finish executing f1, set a breakpoint at the first instruction;

(e) Judge whether current instruction is the first instruction after finish executing a certain function; if yes, then check if there is registered callback function need to be executed before executing the above mentioned function, if yes, then execute the callback function;

(f) Judge whether current instruction should be symbolically executed; if yes, then symbolically execute this instruction; one thing should be indicated is that basically the code of symbolic execution for single instruction is re-used from SMAFE;

(g) If current instruction is symbolically executed, then execute the instruction step by step; if not symbolically execute current instruction, keep executing the tested software; wherein it should be noticed that while executing a certain instruction step by step, a breakpoint will be set at the next instruction after current instruction; and (h) The process for handling CTX_EXIT is rather easy, it mainly focuses on cleaning the system after finishing executing the tested software, and includes unload the tested software and release the memory space occupied by symbolic execution.

3. Mark the symbol source: Usually the symbol is input into the tested software through I/O functions. So in this embodiment, the common I/O functions are processed. The process for fopen and fread are listed below, procedures are similar for other I/O functions.

(a) Before executing fopen, the registered callback function fopen_before is executed, wherein the callback function is used for record the name of the opened file;

(b) After executing fopen, the registered re-call function fopen-after is executed; fopen_after first checks whether the file is successfully opened; if yes, the pointer of this file connects the file name recorded in step (a);

(c) Before executing fread, the registered callback function fread_open is executed; the callback function first captures the file name according to file's pointer, then the callback function will check whether the opened file is a test case, if yes, the address of the buffer in which the content of the file is saved and the size of single element will be recorded;

(d) After executing fread, call the registered callback function fread_after, fread_after will first check whether the test case is read successfully, if yes, associate the buffer address with the actual unit quantity and unit size read into; and (f) The successive execution will re-use the SMAFE code directly, for example, the new item created in the symbol store is corresponding with the entry.

One thing needs being indicated is that when and how to call the callback function is decided by the way of handling the event TEXT_ACCESS.

4. The handling of the instruction of the embedded system: the practical embedded software will frequently call the instructions of the embedded system. So the dynamic symbolic execution software has to be able to handle the instructions of the embedded system reasonably. Usually there are two handling ways: SC_UE and SC_SE. SC_UE concretely executes the instructions of the system without symbolic execution. SC_SE concretely executes as well as symbolic execution the instructions of the system. In this embodiment, SC_UE is adopted. Illustrated in FIG. 2, the left side bracket represents the instruction of the tested software, the right side bracket represents the instructions of the system, and each arrow represents a transfer of the control flow. Usually, the control flow transfers between the instructions of the tested software and the system comprises function calls and function returns. The instruction after the call instruction of the external function will be executed after finishing executing the external function.

Figure 2:
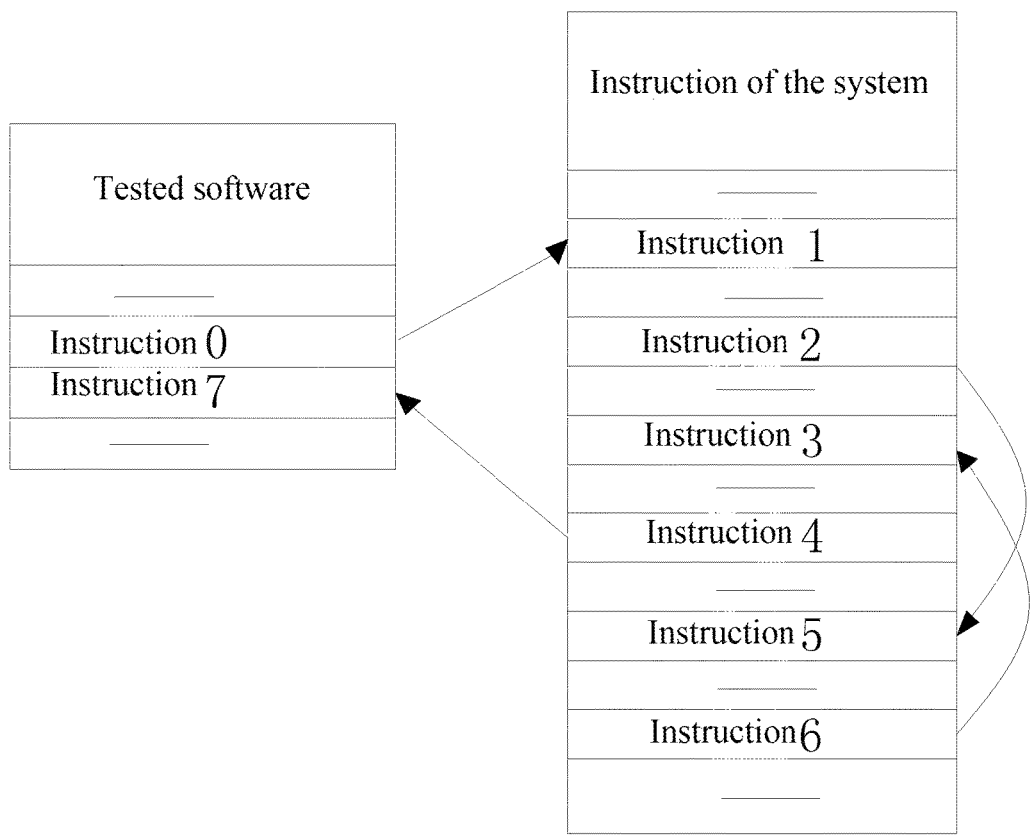
FIG. 2 is a schematic view of SC-UE method according to a preferred embodiment of the present invention.

Illustrated in FIG. 2, when the instruction 1 is executed, the callback function will be called to handle the TEXT_ACCESS event. This callback function will first check whether the instruction 1 should be symbolically executed. According to SC_UE, the instruction 1 belongs to the system, so it will not be symbolically executed. After that, instruction 0 executed before the instruction 1 will be identified. Then this callback function will search the instruction after the instruction 0 which is the instruction 7. The callback function will set a breakpoint at the instruction 7. The last step is resuming the tested software.

The method for handling the instructions of the system which is suggested in this embodiment is effective and simple. This method can handle the complex situation in reality. Such as, in most cases, the call of the external function is nested. Using this method, the nested external function is able to be handled. In this embodiment, after the external code is executed, a breakpoint will be set at the first successive instruction which belongs to the tested software.

The above mentioned embodiment is one of the many applications of this invention. It will not limit the protection range of this invention. Any technology solutions adopt alteration or equivalent substitution are within the protection range of this invention.

What is claimed is:

1. A device for automatically generating test cases for embedded software, comprising:
    a host system for running a symbolic execution part;
    an embedded system for running a concrete execution part;
    a symbolic execution kernel module for marking a symbol source, tracking a symbol propagation, generating a path condition, maintaining an execute tree of a tested software while running;
    a path selection module for running a path selection algorithm;
    a solver for judging whether a path condition is satisfied, wherein if not, indicate a corresponding path is not feasible, if yes, generate a new set of assignments, the new set of assignments is explained as a new test case for covering the path corresponding to the path condition;
    a test case selector for selecting a test case from a test case pool to be an input of the tested software;
    a debugger, as an only module on the host system which communicates with the embedded system, which is in charge of receiving the tested software and commands from the symbolic execution kernel module, receiving the test cases from the test case selector, sending the commands, the tested software and the test cases to the embedded system, and receiving run-time information of the tested software from the embedded system before sending the information back to the symbolic execution kernel module;
    an intermediate language translation module for translating machine instructions into an intermediate language according to a type of the intermediate language which the symbolic execution kernel module is able to process and a type of the machine instructions;
    a concrete execution kernel module, for performing main functions of the concrete execution part, including starting and stopping the tested software, setting breakpoints, single step debugging, continuing to execute the tested software and capturing a value of a designated register and memory; and a debug agent module, as an only module on the embedded system which communicates with the host system, which is responsible for re-directing the commands to the concrete execution kernel module and sending a run-time information of the tested software to the host system, wherein:

the tested software and test cases are uploaded to the embedded system through the debugger and the debug agent from the host system; the concrete execution kernel module starts the tested software; the symbolic execution kernel module captures run-time information of the tested software through the debugger;

when the tested software operates on a symbol source, the symbolic execution kernel module finishes marking the symbol source and tracking the symbol propagation, then generating a path condition; the symbolic execution kernel module sends the generated path condition to the path selection module; the path selection module constructs one or more path conditions according to a path selection algorithm and sends the path condition to the solver; the solver works on the inputted path condition, if there is a solution, the solver will create a corresponding test case and save the corresponding test case in the test case pool of the host system.

2. The device for automatically generating test cases for embedded software, as recited in claim 1, wherein the symbol source is data which are able to be directly handled by clients, such as disk files, network data package and keyboard input.

3. The device for automatically generating test cases for embedded software, as recited in claim 1, wherein the path selection algorithm comprises in-depth priority, breadth priority, generational search, and random search.

4. A method for automatically generating test cases for embedded software, wherein dynamic symbolic execution is divided into concrete execution part and symbolic execution part, the concrete execution part runs on an embedded system, and the symbolic execution part runs on a host system; wherein the method comprises steps of:

S1: starting the host system and the embedded system, uploading a tested software from the host system onto the embedded system through a debugger and a debug agent, uploading an initial test case from the host system onto the embedded system through the debugger and the debug agent, randomly generating an initial test case;

S2: a concrete execution kernel module starting the tested software;

S3 a symbolic execution kernel module capturing a run-time information of the tested software through the debugger, wherein while the tested software operates on a symbol source, a symbolic execution kernel module finishes marking the symbol source;

S4: the symbolic execution kernel module tracking a symbol propagation, generating path conditions, and in the process, capturing run-time information of the tested software through the debugger;

S5: when the tested software stops running and exits normally or when error occurs, the symbol execution kernel module sending the path conditions to a path selection module, according to a path selection algorithm, the path selection module constructing one or more path conditions, and sending the path conditions to the solver;

S6: a solver working on the input path condition, wherein if there is solution, then a corresponding test case is created and saved in a test case pool, if there is no solution, then go to S7; and S7: the symbol execution kernel module judging whether the system should be stopped, wherein if yes, then stop the whole system, if not, a test case selector will choose new test case to be the input of the tested software and return to S2.

5. The method for automatically generating test cases for embedded software, as recited in claim 4, wherein in S7, the stop condition comprises all the paths of the tested software are covered, a pre-set code coverage rate is reached, a bug in the tested software is found and a pre-set test budget is reached.

* * * * *